July 10, 1928.
F. S. CARR
SEPARABLE FASTENER
Filed Dec. 20, 1924
1,676,383
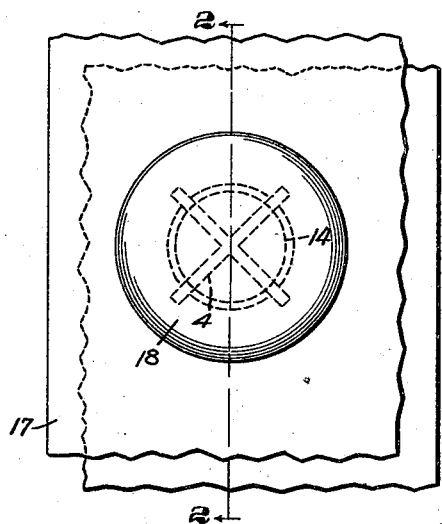
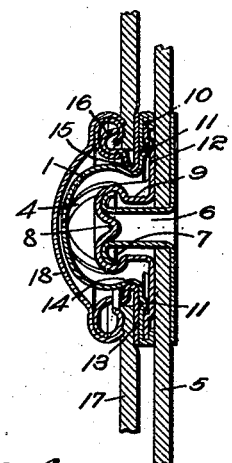
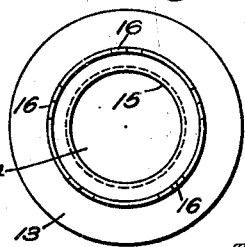
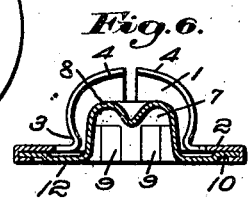
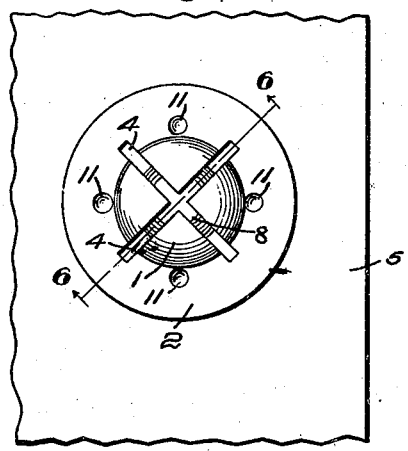
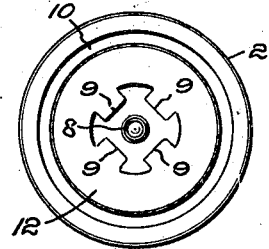
Inventor:
Fred S. Carr,
by Emery Booth Janney Varney
Attys Patented July 10, 1928.

1,676,383

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

SEPARABLE FASTENER.

Application filed December 20, 1924. Serial No. 757,162.

This invention aims to provide an improved separable fastener.

In the drawings, which illustrate a preferred embodiment of my invention:—

Figure 1 is a front elevation of the fastening device;

Fig. 2 is a section on the line 2—2 of Fig. 1;

Fig. 3 is a side elevation of the socket;

Fig. 4 is an elevation view of the socket from the attaching side thereof;

Fig. 5 is a front elevation of the preferred form of the stud;

Fig. 6 is a section on the line 6—6 of Fig. 5, with the support and rivet removed; and Fig. 7 is a bottom plan view of the stud as shown in Fig. 5.

Referring to the drawings, I have shown a contractible and expansible stud secured to a flexible stud-carrying medium and cooperating with a socket also secured to a flexible socket-carrying medium.

The stud, as illustrated, is pressed from a single piece of metal and presents a head 1, a base portion 2 and a neck 3 relatively close to the base portion. The stud is also provided with a plurality of cross slots 4, which extend into the base portion 2 to provide a plurality of contractible and expansible portions which bend upon straight lines passing through the base 2 between the ends of the slots.

While the stud may be secured in any suitable manner to the stud-carrying medium 5, I prefer to secure it thereto by a tubular rivet 6, which passes through the stud-carrying medium 5 and is upset against a rivet-receiving part 7 secured to the base portion 2 of the stud and protruding into the head of the stud, as best illustrated in Fig. 2.

The rivet-receiving part comprises a dome-shaped portion 8 which spreads the rivet and turns it outwardly and downwardly against the tops of the projections 9 (Fig. 2) pressed inwardly from the dome-shaped portion and a base flange 10, which is secured to the base portion 2 of the stud by bending a portion of the base portion 2 over the periphery of the base flange.

The base flange 10 is depressed to form a recess beneath the portions of the base portion 2 of the stud, which bend with the head of the stud, thereby permitting the resilient portions of the head of the stud to contract without interference from the rivet-receiving part 7. The portion of the base which does not expand or contract may be supported relative to the base flange 10 in any suitable manner, but I prefer to support it by a plurality of struts 11 pressed from the base 2, adjacent the resilient portions. These struts 11 extend downwardly (Figs. 2 and 5) and engage the depressed portion 12 of the base flange 10 thereby to prevent bending of the resilient portions of the base 2 of the stud except upon straight lines passing through the base 2 between the ends of the slots 4 and adjacent to the struts. By extending the slots 4 into the base 2, the resilient portions are made more flexible and are less apt to become set than if the slots terminated at the junction of the neck and the base. It is much easier to bend the material upon straight lines passing through the base between the ends of the slots than it would be to bend the resilient parts of the stud about curved lines at the junction between the neck and the base of the stud. Thus the rivet-receiving or attaching part is spaced away from any part of the contractible and expansible portions of the stud so as to permit free flexing of these parts during engagement and disengagement of the stud with a socket.

The socket, as illustrated, is formed from a single piece of metal and comprises a disk-like part 13 having a stud-receiving aperture 14 therethrough, a generally curved reversely bent wall 15 surrounding the aperture 14 and a plurality of attaching prongs 16 extending from the reversely bent portion.

The socket may be attached to the flexible carrying medium 17 by the attaching prongs 16, which pass through an aperture in the carrying medium 17 and engage the usual cap member 18, as illustrated in Fig. 2. Thus a socket is provided which is of a minimum thickness and is relatively flush with the inner face of the socket-carrying medium 17.

When the stud and socket are engaged, separation by resolution of forces arising from lateral strain is effectively prevented by engagement of the face of the socket with the face of the base portion of the stud as shown in Fig. 2. By bringing these two faces together, the line of strain is exerted on the fastener at a point relatively close to the point where the neck of the stud engages the generally curved wall 15, thereby preventing any substantial tipping action which might otherwise result in separation of the fastener by resolution of forces. The fastener may, however, be separated by outward pull exerted upon either the stud member or the socket member.

While I have shown and described a preferred embodiment of my invention, it will be understood that changes involving omission, substitution, alteration and reversal of parts and even changes in the mode of operation, may be made without departing from the scope of my invention, which is best defined in the appended claims.

I claim:

1. A separable fastener stud comprising a head, a neck and a base portion having a plurality of slits extending a substantial distance into said base to provide a plurality of contractible and expansible portions adapted to bend in said base between the ends of the slits, an attaching member presenting a flange secured to the base of the stud, said flange having a depressed portion spaced from the base of the stud to permit free bending of the contractible and expansible portions of said base toward the flange of the attaching part and supporting means located in the recess formed by said depressed portion for supporting the portions of said base beyond the contractible and expansible portions of said base, said supporting means being located a substantial distance from the periphery of the base where it joins the neck of the stud.

2. A separable fastener stud comprising a head, a neck and a base portion having a plurality of slits extending a substantial distance into said base to provide a plurality of contractible and expansible portions adapted to bend upon straight lines in said base between the ends of the slits, an attaching member presenting a flange secured to the base of the stud and spaced from a portion thereof to permit bending of the contractible and expansible portions of said base toward the flange of the attaching part and a plurality of supporting struts between the base of the stud and the flange of the attaching member for supporting the base of the stud when said contractible and expansible portions of the base flex toward the flange of the attaching member.

3. A resilient fastener stud presenting a head, a neck and a base portion, a rivet-receiving part secured to said base and presenting a flange having a depressed area beneath the base of the stud for permitting portions of said base to flex during engagement and disengagement of the stud with a socket and a plurality of struts struck from said base and extending into said depressed area for supporting the portions of said base adjacent the portions which flex toward the flange of said rivet-receiving part.

In testimony whereof, I have signed my name to this specification.

FRED S. CARR.